July 17, 1951 — W. WAY — 2,561,082
GRAPE CUTTER
Filed Dec. 20, 1946
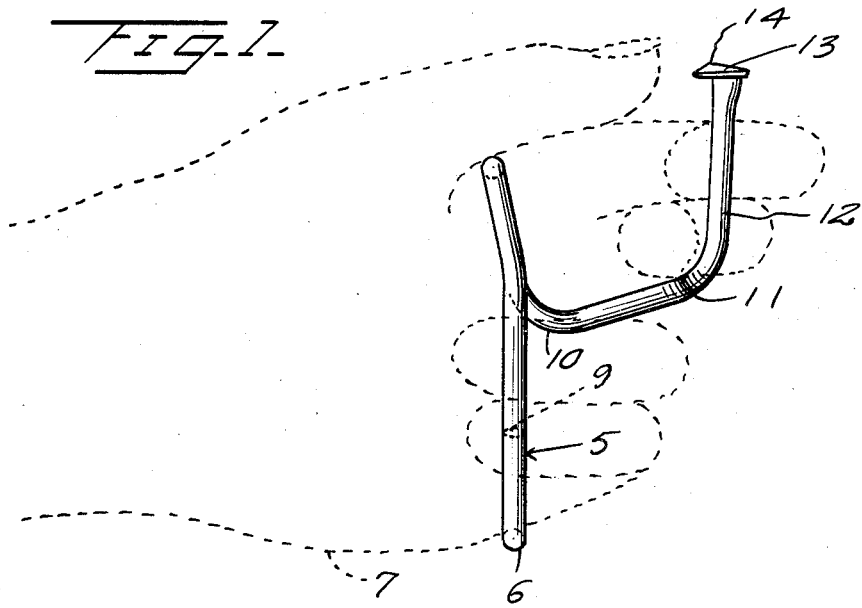
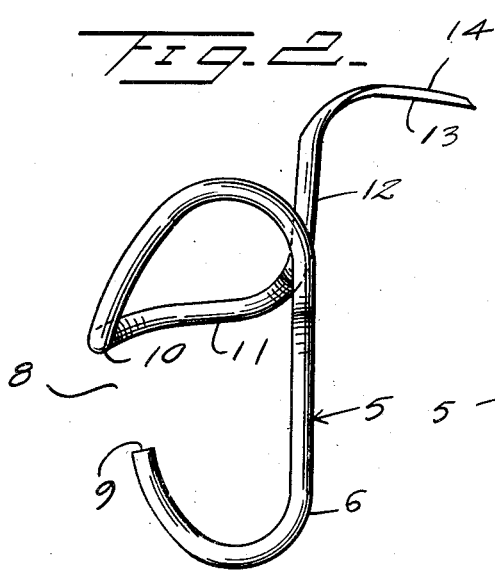
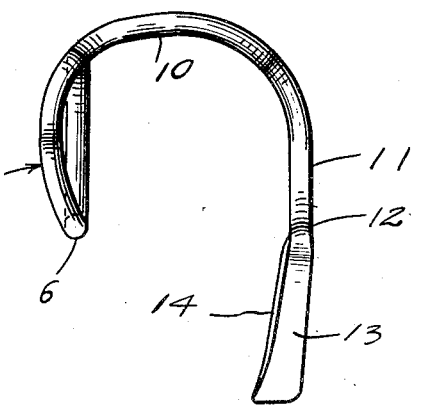
Inventor
William Way
By Randolph & Beavers
Attorneys Patented July 17, 1951

2,561,082

UNITED STATES PATENT OFFICE 2,561,082

GRAPE CUTTER

William Way, Taft, Calif.

Application December 20, 1946, Serial No. 717,459

1 Claim. (Cl. 30—298)

This invention relates to a manually actuated cutting knife adapted to be utilized for severing the stems of bunches of grapes for harvesting the grapes in bunches from a vine.

It is a primary object of the present invention to provide a novel construction of knife by means of which a grape harvester can grasp a bunch of grapes and sever the stem thereof, all with the use of one hand, thus enabling the harvester to use each of his hands independently for simultaneously cutting and grasping bunches of grapes.

Another object of the invention is to provide a cutter which is so constructed that the grasping action of the human hand will actuate the cutting blade for severing the stem of a bunch of grapes, so that in the natural action of taking hold of the bunch of grapes with the hand, the stem will be cut to sever the bunch from the vine.

Various other objects and advantages of the invention will hereinafter become more fully apparent from the following description of the drawing, illustrating a preferred embodiment thereof, and wherein:

Figure 1 is a side elevational view of a preferred embodiment of the cutter shown constructed for use with and applied to the left hand;

Figure 2 is an end view in elevation of the same looking from left to right of Figure 1, and Figure 3 is a top plan view thereof.

Referring more specifically to the drawing, wherein a preferred embodiment of the cutter is illustrated for use with the left hand, the numeral 5 designates the improved cutter in its entirety and which is formed from a single strand of relatively heavy gauge wire having one end bent to form an elongated loop 6 adapted to fit around the palm and back of the left hand, as indicated in broken lines at 7 in Figure 1. The loop 6 is provided with a gap 8 formed by one terminal 9 of the wire strand and an out-turned intermediate portion 10 thereof. The wire strand from which the cutter 5 is formed is relatively resilient so that the loop 6 can be sprung outwardly to permit insertion or removal of the hand 7 and so as to resiliently engage around the palm thereof and with the gap portion 8 disposed on the outer side of the hand, to form a resilient and reasonably snug engagement with the hand for supporting the cutter 5 thereon, without the necessity of the cutter being grasped.

The out-turned arcuate portion 10, at its opposite end, terminates in a laterally extending shank portion 11 which extends inwardly between the second and third fingers of the hand 7 and which merges with an upstanding shank portion 12 which is disposed on the inner side of the upper and middle fingers and which extends to above the upper part of the loop 6. Shank portion 12 is spaced forwardly from the loop 6 by said shank portion 10, which is disposed substantially at a right angle to the plane of the loop 6, as seen in Figure 3.

The upper, free end of the shank portion 12 termintes in an out-turned terminal portion, forming the opposite end of the wire strand and which is flattened to form a blade 13. The blade 13 projects laterally from the shank portion 12 and from the opposite side thereof to the loop 6. As seen in Figure 3, the inner longitudinal edge of the blade 13 is beveled on its upper side to form a cutting edge 14 which faces toward the loop 6. The blade 13 is inclined downwardly toward its free end and toward its back edge, as seen in Figures 1 and 2.

From the foregoing it will be readily apparent that the fingers of the hand 7 may be slipped through the loop 6 from the side thereof, away from the shank portions, so that the loop may be moved to a position, as seen in Figure 1, to engage around the back and palm of the hand and at the base of the thumb. As the hand 7 is moved toward a closed position, the index and middle fingers will engage around the shank portion 12, as clearly illustrated in Figure 1. It will thus be readily apparent that if a bunch of grapes, not shown, is grasped in the hand 7, the grasping action in taking hold of the grapes, will cause the shank portion 12 to yield toward the loop 6, thus causing the cutting edge 14 to move toward the tip of the thumb, so as to sever the stem of the grape bunch between the grapes and the vine stalk. The shank portions 11 and 12 thus function as a spring for resiliently supporting the blade 13 relatively to the loop 6 and so that the blade is normally biased away from the loop. It will thus be readily apparent that a normal action of the hand in taking hold of a bunch of grapes will actuate the blade 13 for severing the bunch so that only one hand is required for harvesting the grape bunch.

While the invention has been described for use with the left hand, it will be readily apparent that by reversing the position of parts, the cutter 5 would then be constructed for use in the same manner with the right hand, and it is of course intended that a harvester use a cutter 5 on each hand so that each hand may be utilized independently for harvesting bunches of grapes.

While the invention has been illustrated and described as formed from a single strand of wire, it will be readily apparent that it could be constructed in other ways so long as the hand engaging part thereof and the blade are resiliently disposed with respect to one another. Various other modifications and changes are likewise contemplated and may obviously be resorted to, without departing from the spirit and scope of the invention as hereinafter defined by the appended claim.

I claim:

A cutting knife formed from a single elongated strand having one end portion providing an elongated handle, in the form of a loop, said handle having an index and middle finger receiving loop portion at one end thereof and a third and fourth finger engaging portion at its opposite end, said handle portions being disposed in substantially the same plane, said strand at the end opposite from the handle loop having a portion forming a blade shank and including a first shank portion projecting from the handle intermediate of the handle end portions and at substantially a right angle to the plane of the handle, and a second shank portion extending at an angle from the first shank portion disposed substantially in opposed relationship to the handle portions, and a blade constituting the opposite end of the strand and extending integrally from the free end of the second shank portion and disposed transversely thereof, said blade having a cutting edge facing inwardly of the knife and toward the handle.

WILLIAM WAY.

REFERENCES CITED

The following references are of record in the file of this patent:

UNITED STATES PATENTS

| Number | Name | Date |
|---|---|---|
| 1,176,930 | Smith | Mar. 28, 1916 |
| 1,678,570 | Longcor | July 24, 1928 |
| 1,727,286 | Hainre | Sept. 3, 1929 |